Patented Feb. 7, 1933

1,896,807

UNITED STATES PATENT OFFICE

GEORG BAUER, OF HANAU ON THE MAIN, GERMANY

PROCESS FOR THE RECOVERY OF PLATINUM AND ITS BYMETALS FROM MATTES

No Drawing. Application filed February 26, 1930, Serial No. 431,624, and in Germany January 24, 1929.

An application has been filed in Germany, January 24th, 1929.

In metallurgical works, copper is employed in addition to lead, as collector of the noble metals (silver, gold and platinum); and it is also known to recover platinum and its by-metals from the residues of the nickel process (Sudbury). Metallic iron has also been proposed for collecting gold (German Pat. 354,174), but has hardly been applied to any great extent up to the present.

Owing to the divergent character of the heavy metals and metalloids mostly present in the originating materials, the direct fusing of materials, such as ores, concentrates, sweeps and the like (containing noble metals) with one of the aforesaid metals, for the purpose of causing the noble metal to pass into the collecting metal, would furnish such a highly contaminated product as to render its further treatment a matter of great difficulty attended with considerable expense and heavy losses of noble metal.

To a certain extent lead constitutes an exception owing to the relative ease with which it is reduced and melted. Nevertheless, even in this case, considerable difficulties arise by reason of certain impurities such as Cu, Ni, S, As, Sb and Te, present in the charge. This is particularly the case in connection with the recovery of platinum and its by-metals, since these metals, in particular, display an affinity for the unwelcome intermediate products of the lead process, such as liquation residues, dross and scum, speiss, etc., by reason of their chemical relationship with the constituents of said intermediate products.

In the case of the other metals coming under consideration as collectors, the conditions are still less favourable in several respects. Except when iron is used for the separation of the precious metals the procedure adopted is to produce an intermediate product, a so-called matte, which chiefly consists of the sulphides of Cu, Fe and Ni, and which takes up the whole of the noble metals present.

In these smelting processes the first stage in the recovery of the noble metals consists in extracting them in conjunction with the other metals concerned (Cu, Ni) from said mattes.

The mattes are generally subjected to a roasting and reaction treatment in a reverberatory furnace or converter in which, by powerful oxidation, the sulphur in the matte is oxidized to $SO_2$, and the Fe to FeO, the latter being scorified by $SiO_2$. From the end products, viz, crude copper and refined nickel matte, the corresponding metals (copper and nickel) are recovered in the pure state by known methods, and the noble metals are contained in the anode sludges or residues.

For the sake of completeness, mention may also be made of the suggested dipping of the matte into molten lead.

Direct methods of dissolving the matte have also been proposed for example in German Patent 289,260, but all these known processes for recovering noble metals are attended with more or less serious disadvantages.

For example, the occasionally protracted powerful oxidation in the roasting and reaction treatments leads to considerable losses by volatilization (Os, Ru) and scorification especially of the platinoids. Moreover, the recovery of the noble metals is a lengthy operation since the various processes not infrequently lead to the dissemination of the noble metals among intermediate products, the treatment of which is a difficult matter.

The treatment of the matte by direct solution requires extensive apparatus and large quantities of acid, and in addition to producing troublesome waste liquors and poisonous gases ($H_2S$), again leaves the noble metals in the form of highly contaminated intermediate products, which have to be further treated by other processes also involving loss.

On the other hand if the mattes be allowed to act in a molten state—preferably in presence of a reducing flame—on a heavy metal such as Cu, Ni or Fe, there will gradually be established between the metal and the matte a state of equilibrium which is mainly determined—apart from the temperature—by the masses in reaction and the degree of affinity between the reacting substances.

If it be desired to prevent excessive contamination of the bottom metal, this can be done, either by increasing the amount of the metal accordingly or by selecting a matte in which the sulphides of the foreign metals (that is, metals other than the platinum metals) therein do not exceed a certain amount. In this process, as in the case of dipping into lead, the noble metals of the matte pass over in a purely mechanical manner into the specifically lighter bottom metal, or else enter into reaction therewith in the event of their being present in the form of suitable compounds.

I have found that in order to obtain the best results, using copper as the collecting metal, the copper matte (containing the precious metals) with which the collecting metal is to react should contain a very large proportion of copper, preferably not less than sixty per cent. of copper.

Accordingly, in the preferred form of my invention, a copper matte containing the precious metals and not substantially less than sixty per cent. of copper, is caused to react at smelting heat with a relatively large amount of copper as collecting metal, thereby causing substantially the whole of the precious metals to be taken up by the metallic copper.

Owing, on the one hand, to the fact that the platinum metals have a greater affinity for copper or the metals of the iron group than for lead and, on the other hand, to the lower specific gravity, higher melting point and greater affinity for sulphur displayed by Cu, Ni and Fe, the migration of the noble metal into these bottom or collecting metals proceeds in a far more satisfactory manner than in the case, for instance, of lead.

Thus in accordance with:

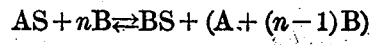

(in which A denotes the platinum metals, n the amount of the concentrating metal B), and given suitable temperature and correct selection of the relative proportions according to the law of mass action, the sulphides of the platinum metals will be decomposed by the collecting metal and the noble metals will be taken up by the latter. The same occurs in the case of the otherwise so refractory Sperrylite, $PtAs_2$ and of the sulphursenides and antimonides of the platinum metals recently discovered in South Africa.

Moreover, the employment of sufficient quantities of a suitable collecting metal, such as Cu, Ni or Fe, provides an excellent means of protecting the noble metals against volatilization and scorification. One may suppose that, in consequence of their density, the Pt metals tend, after sinking into the collecting metal, to concentrate, as far as possible, in the lowest part of the bath, i. e. at the bottom. It will thus be evident that, for example, in operating with the converter process, it will first of all be preferable—in order to maintain the temperature—to employ an apparatus provided with a special source of heat, such as a laterally disposed stationary burner (Tafel, "Lehrbuch der Metallhüttenkunde", published 1927 by S. Hirzel, Leipzig, Vol. I. 307, note); and that secondly, in order to prevent losses of noble metal in fining the collecting metal, or in blowing the matte and concentrating metal to produce crude metal (which, of course, cannot be carried out until most of the noble metal has passed into the collecting metal), the air current must be directed horizontally so as not to penetrate too deeply below the surface of the bath, or only enter the molten layer of matte.

The composition of the matte is an important factor in connection with the choice of the collecting metal when it is necessary to avoid excessive contamination of the latter in view of its further treatment.

When copper forms the collecting metal, it is advisable to use mattes containing 60% and over of copper. Moreover the matte should contain only such an amount of Ni that the collecting metal will contain only about 10% of that metal after the absorption of same.

Extensive experiments have shown that when iron is used as the collecting metal, the best results are obtained with a matte containing at least 3% of Cu. If excessive contamination of the collecting metal is undesirable, the copper content should not exceed 50% (Tafel, 1. c., I.172).

When nickel is the collecting metal, the so called nickel mattes come under consideration, containing $Ni_3S_2$ (Tafel 1. c., Vol. II (published 1929) p. 518) as principal constituent. When the process is applied to Pt-Ni-bearing magnetic pyrites of the Sudbury or Norite (South Africa) type, which are always more or less cupriferous, nickel-copper mattes will chiefly come under consideration. Moreover, the $Cu_2S$ (and FeS) content in the matte could be regulated by the aid of the Orford process. Finally, since the amount of nickel going into the slag is lost, and the price of nickel is relatively high, the Ni and Cu content in the matte should be such that these losses of Ni (and any attendant losses of noble metal) by scorification will not exceed a reasonable limit. Such content, however, may in general exceed 20% of Ni plus Cu, whereas the Fe content should be less than 50%.

In the preparation of suitable mattes for the process, it must be kept in mind that the requisite concentration of the main metal (copper, iron or nickel) in the matte in a single smelting operation is very desirable since, for well-known reasons, separate concentration operations for the production of high-grade copper or nickel mattes are out of the question. The desired result is obtained by allowing oxides, such as $Fe_2O_3$, which furnish oxygen to act upon the excess of FeS or Fe contained in the charge, for example, coarse metal low in Cu and Ni, copper pyrites, magnetic pyrites, etc., so that both these substances are transformed into FeO (Fes+3Fe$_2$O$_3$=7FeO+SO$_2$), which is scorified. The term "coarse metal" is applied in metallurgy to a low-grade matte (mixture of sulfides), that is to say a matte containing a low percentage of copper sulfide (when copper is used as the collecting metal) or a low percentage of nickel sulfide (when nickel is used as the collecting metal), the iron sulfide content being greater than that of the other sulfide in each case. Iron oxides may also be replaced to some extent by copper oxides or copper silicates (in the case of copper matte), and by NiO or nickel silicates (in the case of nickel matte). This transformation process, however, can only be satisfactorily carried out in a reducing atmosphere, though it may also be effected in a neutral or slightly oxidizing atmosphere.

If the material to be smelted originally contains an excess of oxides (e. g. Fe$_2$O$_3$), substances containing carbon may be added, so as to replace to some extent the reducing action of the FeS; that is to say, the use of substances containing carbon enables a smaller amount of coarse metal, copper pyrites, etc., to be employed. This is important in operating solely with sweeps.

Iron may be used as a collecting metal successfully only as long as the matte is low in Ni and Cu, and therefore consists chiefly of FeS. Naturally, in practice the Ni and Cu content of the matte fluctuates, and it may happen that the matte will temporarily have a high Ni or Cu content. When this happens, the high Ni or high Cu matte will be utilized as an addition to nickel or copper respectively in one or the other of the processes described above in which the collecting metal consists of nickel or copper respectively.

The amount of collecting metal to be taken depends on the content of noble metal, or on the amount of impurities to be expected in the collecting metal. The former should not, if possible, exceed 1% and the latter not more than about 15% as a rule.

Suitable collecting metals comprise old or scrap metals. Such metals may also be liberated from their compounds, ores and the like, by reaction or reducing processes, for example, during the smelting process for the production of the matte, or in other ways, and added to the bath.

The addition of the collecting metal can therefore be effected before, during or after equilibrium has been attained between matte and slag.

To prevent the first charge from caking at the bottom, at the commencement of the smelting operation, or after tapping, a portion of the collecting metal should always be melted down before admitting the first charge.

The process may be carried out as follows:

(1) By separating the matte from the collecting metal after the noble metal has passed into the latter, and then treating the collecting metal separately for the recovery of the noble metal, the matte being employed over again in succeeding operation so long as its sulphur content will allow.

(2) By treating the matte and collecting metal, after removing the slag, by oxidation and reaction processes to convert it into crude metal, and then transforming the latter into pure metal and anode sludge (containing the noble metal) or residues, in known manner. The treatment of the matte comprises a roasting treatment and a smelting treatment, which in some cases may be carried out simultaneously, side by side. One of the older procedures for treating the matte consists in subjecting it to a series of oxidizing roasts each followed by a reducing fusion. The present customary procedure consists in forcing compressed air through the molten matte, whereby oxidation by oxygen and reduction by sulfur will go on simultaneously.

The process according to (1) can be successfully employed, for example, when operating solely with sweeps in the event of an insufficiently available supply of coarse metal low in copper or of copper pyrites or similar material, whereas the process according to (2) is more particularly indicated for combining the recovery of the noble metal with that of the collecting metal on a large scale.

If necessary the crude metals are refined by heat, and then further treated with the aid of electrolysis or with a solution process, etc. The noble metals are collected as anode sludge or residues and recovered by known chemical or metallurgical methods.

Rich slags (e. g. refinery slags) are returned to the process or are treated separately by smelting these slags, thereby obtaining a very poor slag which is thrown on the dump and coarse metal, the latter being returned to the process. The slags from smelting the matte in the iron process, and to some extent in the copper process as well are worthless. The slag has the composition: SiO$_2$, 35–45%; FeO, 25–35%; CaO, 10–20%.

Suitable furnaces comprise reverberatory furnaces, electric furnaces and finery furnaces in which, as in a converter, the air is admitted horizontally through nozzles, and in such a way that the row of nozzles is brought into position slightly below the surface of the molten charge, by turning the furnace, whilst at the same time, the requisite temperature is maintained by means of a suitable source of heat.

*Examples*

A. For a copper concentrate containing noble metal, the recovery of the noble metal to be combined with the production of copper.

The following additions are made:

Ferric oxide concentrates and sweeps, containing noble metal; coarse metal containing noble metal, the addition being in any requisite amount; lime and powdered charcoal.

*Method.*—The charge is calculated on the basis of a slag as specified above. Reduction of the ferric oxide to FeO is brought about partly with powdered charcoal, and partly by the FeS (or Fe) of the copper concentrate or coarse metal, so that the copper content of the matte amounts to 60% or more.

*1st Operation.*—Scrap or cementation copper is melted down and the well mixed charge added. The mass is thoroughly worked about until a state of complete equilibrium is established between the matte and slag on the one hand, and the matte and bottom copper on the other. The reducing flame is maintained during the reaction period. When terminated the slag (Cu. 0.3–1%; Ni, 0.5%; noble metal up to 10 grms. per ton) is removed.

The 2nd operation comprises oxidation and reaction smelting in the same furnace or blowing to crude copper in a rotary finery furnace provided with nozzles followed by refining, casting into anodes and electrolysis.

Specially suitable for South African concentrates.

*Example B.*—For magnetic pyrites of the Sudbury type containing Pt and Ni.

The additions are as in the case of Example A. In the ore and coarse metal, the nickel content exceeds the copper content.

*Method.*—On the whole the procedure is the same as in A. The Ni+Cu content of the matte is 20% and over and the Fe content below 50%. When sufficient amounts of cheap Cu are available, the recovery of the noble metal can be carried out, in this case also, according to the principles of the specified Cu process.

*Example C.*—For magnetic pyrites of the Norite (S. Africa) type, containing Pt. and platinoids in combination using the iron process.

*Method.*—The Norite concentrates are smelted to crude metal. The scrap iron is added or the Fe reduced from concentrates (containing ferric oxide and noble metals), in combination with the smelting of the coarse metal or separately. The slag and the impoverished matte are removed. The iron is refined and cast to anodes. Electrolysis follows.

Matte containing Cu and Ni is sent to the copper or nickel process or the impoverished matte is roasted and leached; the residue from leaching being employed as the ferric oxide addition material.

Alternatively if a small Cu–Ni content is not harmful, the slag is removed and the matte and iron are blown for the production of refined metal in the manner specified under A2.

*Example D.*—When working with sweeps according to the copper process the following figures have been found suitable.

3500 kg. of sweeps and African concentrates (additions included) are smelted. The total content of noble metals in the charge materials is: Silver 2628 grms. gold 899 grms. platinum 1780 grms., palladium 277 grms., Rh, Ir, Ru, Os, 409 grms.

Matte from previous melts with 65.1% of Cu, ferric oxide, lime (all containing precious metals) were added together with powdered charcoal.

Copper is added as 500 kg. of scrap copper.

The smelting furnace is a small reverberatory furnace fired with water gas and having a capacity of 750 kg. in 24 hours.

The fused slag (2680) contains: Au. 6.6 grms., or 0.00025% Pt. 23.0 grms., or 0.00086% and no Pd. Rh, Ir. Os, or Ru. The copper content in the slag is 0.2–1%, nickel content 0.2–0.5% while the composition of the slag is: $SiO_2$, 40–45%; FeO, 40%, CaO, 16%. The matte obtained (486 kg.) contained 71.4% of copper.

Amounts of noble metal in:

| Final matte 486 kg. | Added matte 199 kg. | Increase in final matte |
|---|---|---|
| Ag 0.312% or 1516 grms. | 1404 grms. | 112 grms. |
| Au 0.017% or 82.6 grms. | 120.6 grms. | |
| Pt 0.011% or 53.5 grms. | 41.6 grms. | 11.9 grms. |

Yields of noble metals in crude copper.

Ag. 2628−112.0 grms.=2516 grms., or 95.74%
Au. 899− 6.6 grms.=892.4 grms., or 99.27%
Pt. 1780− 34.9 grms.=1745.1 grms., or 98.04%
Pd. 277.1 grms. =277.1 grms., or 100%
Ir. Rh. Ru. Os. 409 grms.=409.0 grms., or 100%.

The actual yield of Ag—Au—Pt is higher, amounting to about 99% in current working, because the above tabular arrangement does not include the yields of noble metal obtained in the treatment of the matte withdrawn from time to time. Moreover, the content of noble metal in the slag chiefly consists of globules of matte which have been carried away and imperfectly deposited, so that, by employing suitable larger smelting furnaces, the smelting of worthless slags can be counted upon.

The advantages of the foregoing process consist therefore in the rapid extraction of the noble metals with a minimum of losses and at small expense which can be fully or mainly recouped (according to the choice of the process and the value of the collecting metal) by the increased value resulting by conversion of the scrap metals to electrolytic metal.

Having now particularly described and ascertained the nature of my said invention and in what manner the same is to be performed, I declare that what I claim is:

1. The process for the recovery of platinum and noble metals accompanying it, from mattes containing at least 60% of copper, which consists in causing the matte to react at smelting heat in a reducing atmosphere with a sufficient additional amount of copper to cause the noble metals contained in the matte to be taken up or collected by the copper of the melt.

2. The process for the recovery of platinum and noble metals accompanying it, from mattes the predominating metallic constituent of which is a readily reducible metal which will alloy selectively with the noble metals of the matte, which consists in causing the matte to react at smelting heat in a reducing atmosphere with a sufficient additional amount of said readily reducible metal to cause the noble metals contained in the matte to be taken up or collected by said readily reducible metal, combined with a process for the metallurgical recovery, from the mattes, of the said readily reducible collecting metal, in which process for the recovery of the collecting metal after the termination of the reaction period in a reducing atmosphere and after the noble metals have passed into the collecting metal, i. e. after equilibrium has been established between matte and slag on the one hand, and between matte and bottom metal on the other hand, the slag is removed and the entire contents of the furnace are converted into crude metal by a treatment involving oxidation by oxygen and simultaneous reduction by sulfur.

3. The process for the recovery of platinum and noble metals accompanying it, from mattes the predominating metallic constituent of which is a readily reducible metal which will alloy selectively with the noble metals of the matte, which consists in causing the matte to react at smelting heat in a reducing atmosphere with a sufficient additional amount of said readily reducible metal to cause the noble metals contained in the matte to be taken up or collected by said readily reducible metal, separating the resulting slag from the resulting crude metal, heating such crude metal and simultaneously injecting air into it in a substantially horizontal direction, from points below the surface of the molten body of crude metal, at the sides of said body.

4. The process for the recovery of platinum and noble metals accompanying it, from mattes the predominating metallic constituent of which is copper, which consists in causing the matte to react at smelting heat in a reducing atmosphere, with a sufficient additional amount of copper to cause the noble metals contained in the matte to be taken up or collected by said copper.

In testimony that I claim the foregoing as my invention, I have signed my name this 12th day of February, 1930.

GEORG BAUER.